United States Patent

Esten

[15] 3,688,790
[45] Sept. 5, 1972

[54] PRESSURE BALANCE VALVE

[72] Inventor: Harold Esten, 73 Messenger Lane, Willingboro, N.J. 08043

[22] Filed: July 13, 1970

[21] Appl. No.: 54,542

Related U.S. Application Data

[63] Continuation-in-part of Ser. No. 777,976, Nov. 1, 1968, abandoned, which is a continuation-in-part of Ser. No. 447,007, April 9, 1965, abandoned.

[52] U.S. Cl. ..................137/98, 92/100, 251/86
[51] Int. Cl. .....................F16k 11/04, G05d 23/13
[58] Field of Search ....137/98, 100, 101; 251/84, 86, 251/61.2, DIG. 1; 92/98 R, 99, 100, 101, 102

[56] References Cited

UNITED STATES PATENTS

| 3,324,872 | 6/1967 | Cloud | 137/98 |
|---|---|---|---|
| 2,713,989 | 7/1955 | Bryant | 251/DIG. 1 |
| 2,997,028 | 8/1961 | Ayers, Jr. | 92/99 X |
| 2,741,205 | 4/1956 | Paulton | 92/98 X |
| 2,145,114 | 1/1939 | Gibbs et al. | 137/100 X |
| 1,969,366 | 8/1934 | Green | 137/100 X |
| 2,200,578 | 5/1940 | Mahon | 137/98 |
| 2,313,797 | 3/1943 | Bailey | 137/100 |
| 2,275,712 | 3/1942 | Zand | 92/100 |

Primary Examiner—Robert G. Nilson
Attorney—Caesar, Rivise, Bernstein & Cohen

[57] ABSTRACT

A pressure equalizing device having hot and cold inlet and outlet chambers with an interposed intermediate chamber containing a flexible diaphragm, valve stems extending through the intermediate chamber and having valve heads that move with the flexing of the diaphragm, such that a change in relative pressure in the inlet chambers affects the change in relative pressure in the outlet chambers by transmission through the diaphragm means that shift the valve head to correct the change in relative pressure.

In another embodiment of the invention there is provided a two-piece housing with means to locate the housings with respect to each other. There is also provided a means for locating the diaphragm to provide a proper squeeze on the diaphragm as well as a floating washer for sealing purposes.

4 Claims, 10 Drawing Figures

PATENTED SEP 5 1972

INVENTOR.
HAROLD ESTEN

BY
Caesar, Rivise,
Bernstein & Cohen
ATTORNEYS.

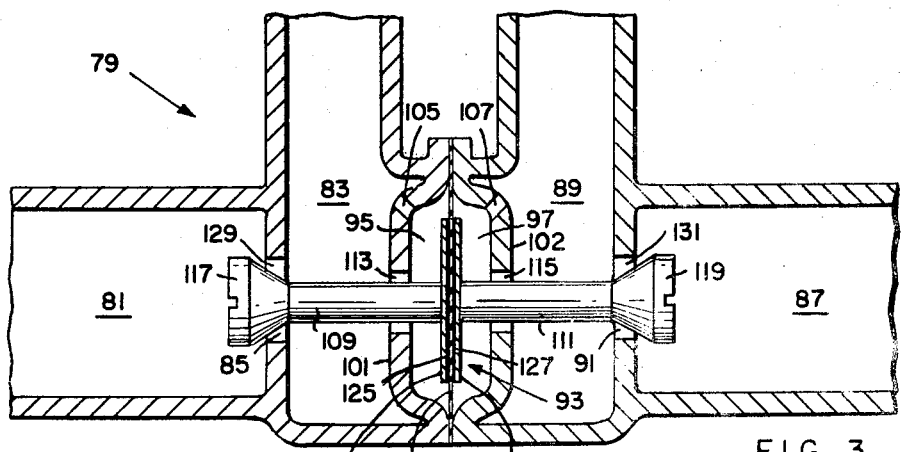

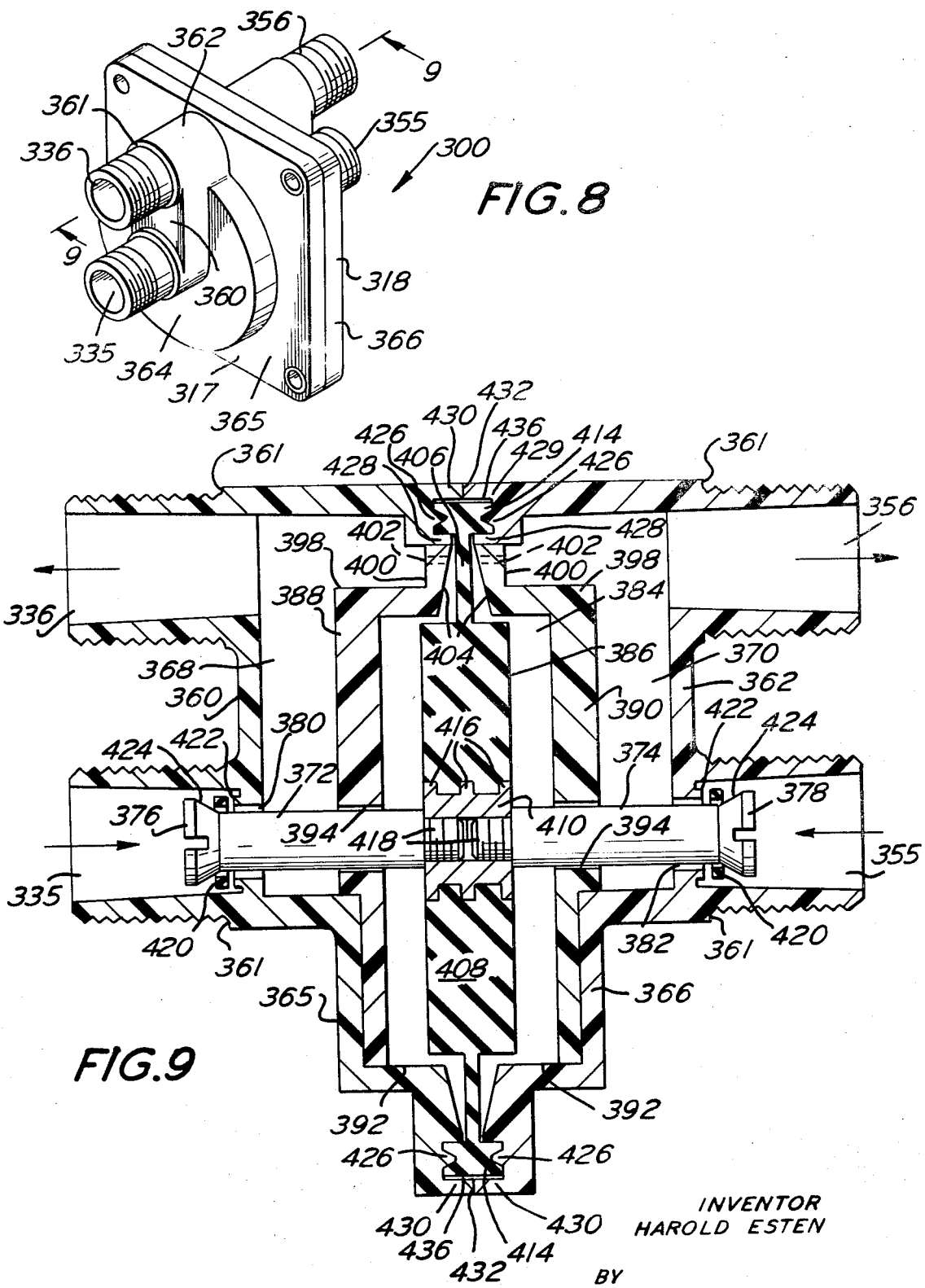

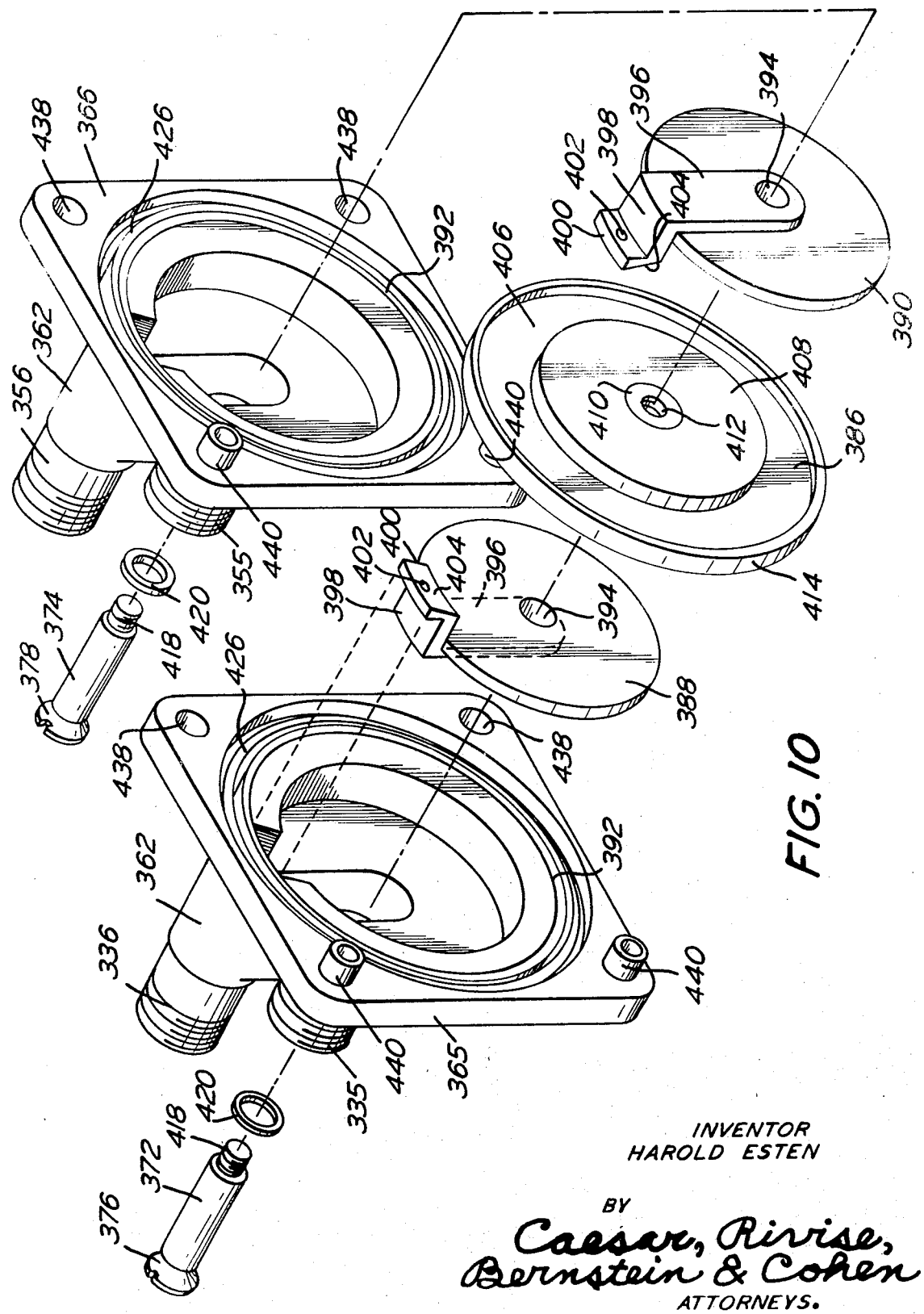

3,688,790

PRESSURE BALANCE VALVE

This application is a continuation-in-part of my patent application Ser. No. 777,976, filed Nov. 1, 1968, now abandoned which in turn was a continuation-in-part of my patent application Ser. No. 447,007, filed Apr. 9, 1965, now abandoned.

BACKGROUND OF THE INVENTION

This invention relates to mixing-value devices for automatically maintaining desired proportions of mixed liquids, and is especially concerned with a mixing valve for controlling the temperature of water in a shower bath.

When taking a shower, if the water is turned on elsewhere in the line, a person may be scalded by the sudden drop in cold water pressure. This is especially important in the shower rooms of hospitals, institutions, clubs, and the like. Also, it is important in motels and hotels, where even if the person is not scalded, he may be subjected to alternate streams of hot and cold water, much to his discomfort and distress. As a result, he may decide never to patronize that motel or hotel again.

SUMMARY OF THE INVENTION

While the mixing or blending valve of the present invention has been primarily developed for use in shower baths, and will be illustrated and described hereinafter with particular reference thereto, it is appreciated that the device is capable of other application, all of which are intended to be comprehended herein.

It is an important object of the present invention to provide a shower temperature control of the type described which is extremely simple in construction, substantially completely eliminates wear of parts, minimizes stress and eliminates fatigue in the assembled components, and which is highly accurate in operation without requiring precision in manufacture or close tolerances.

It is another object of the present invention to provide a shower temperature-control device having the advantageous characteristics mentioned in the preceding paragraph, which is durable and reliable throughout a long useful life, is entirely automatic in operation requiring no setting or adjustment by the user, and which can be economically manufactured for sale at a reasonable price.

Other objects of the present invention will become apparent upon reading the following specification and referring to the accompanying drawings, which form a part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 3 is a view in section of another embodiment of the invention;

FIG. 4 is a view in section of another embodiment of the invention;

FIG. 5 is an enlarged view of a valve head and stem which forms an element of the invention;

FIG. 6 is an end view of the element of FIG. 5 looking from the right of FIG. 5;

FIG. 7 is a view in section of a diaphragm assembly which forms an element of the invention;

FIG. 8 is a perspective view showing another embodiment of the invention;

FIG. 9 is an enlarged sectional view taken along the lines 9—9 of FIG. 8; and

FIG. 10 is an exploded sectional view of the device of FIG. 8 showing certain internal details of the invention.

DESCRIPTION OF THE PREFERRED EMBODIMENTS

Figure 1:
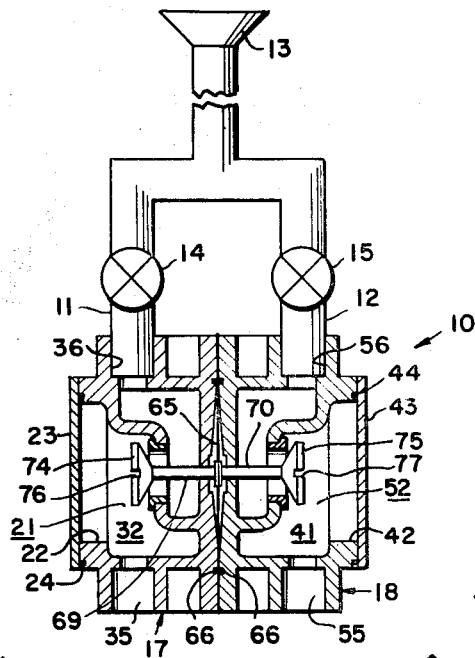
FIG. 1 is an elevational view showing the arrangement and location of a shower control device of the present invention in a shower system.

Referring now more particularly to the drawings, and specifically to FIG. 1, a control device is there generally designated at 10 and is connected in the hot and cold water lines 11 and 12 leading to a shower head 13. Connected in the hot and cold water lines 11 and 12, between the temperature control device 10 and shower head 13 are hot and cold manually operated water valves 14 and 15.

Figure 2:
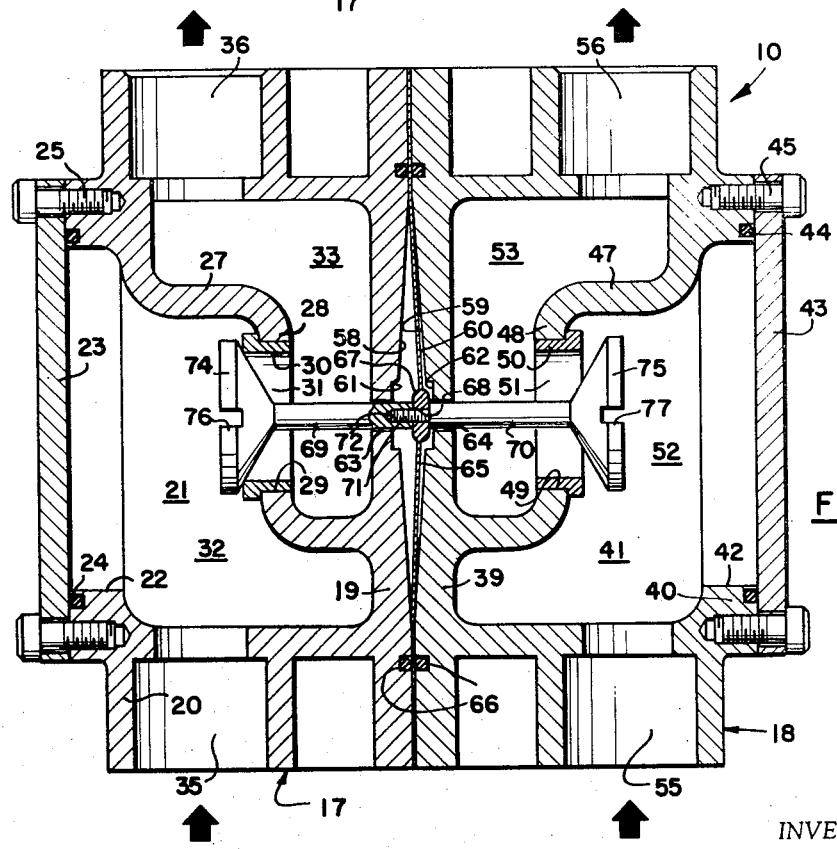
FIG. 2 is an enlarged sectional elevational view showing in greater detail a shower temperature control constructed in accordance with the teachings of the present invention.

As best seen in FIG. 2, the temperature control device 10 includes a pair of substantially identical sections 17 and 18, which sections are of opposite hand and respectively accommodate hot and cold water or other desired fluid to be mixed. The hot water section 17 includes inner and outer side walls 19 and 20, a back wall 21, and a front wall (broken away). The outer side wall is provided with an access opening 22 closed by a removable closure or plate 23 and sealed by an 0 ring 24 or other suitable sealing means. Fastener elements or screws 25 may secure the closure or cover plate 23 on its closed position.

The interior of hot water section 17 is subdivided by a somewhat Z-shaped wall 27 extending forwardly and rearwardly between the front and back section walls and disposed in somewhat inclined relation, passing downwardly and laterally inwardly. The dividing wall or partition 27 includes a generally vertical medial portion 28 having a generally horizontal through opening 29 provided with a valve seat 30, which defines therewithin a valve opening 31. The valve opening 31 may have its axis disposed generally horizontally and extending laterally.

By this construction, the interior of the hot water section 17 is subdivided into a lower, outer inlet chamber 32, and an upper, laterally inner outlet chamber 33. At the lower end of hot water section 17 there is provided a coupling element or inlet 35 communicating with the interior of inlet chamber 32 for connection to a hot water supply pipe. The upper end of hot water section 17 is provided with a coupling element or outlet 36 communicating with the interior of outlet chamber 33 and adapted to connection by pipe 11 to the hot water hand valve 14.

The cold water section 18 is similar, including laterally inner and outer side walls 39 and 40, and a back wall 41 and front wall (broken away). An access opening 42 may be formed in the outer side wall 40 and closed by a closure or cover plate 43. The access opening 42 may be sealed by suitable sealing means 44, and the cover 43 secured in position by fasteners 45.

The interior of cold water section 18 is subdivided or partitioned by a somewhat Z-shaped wall 47 extending forwardly and rearwardly between the front and back walls of the cold water section and progressing generally downward and laterally inward across the interior of the cold water section. A medial portion 48 of partition or wall 47 is disposed generally vertically therein a valve seat 50 which defines a valve opening 51. The valve opening 51 may have a laterally extending, generally horizontal axis, substantially coaxial with that of valve opening 31.

The partition or wall 47 subdivides the interior of cold water section 18 into a lower, outer inlet chamber 52, and an upper, laterally inner outlet chamber 53. At the lower end of cold water section 18 there is provided a cold water inlet or coupling element 55 for connection to a cold water supply pipe, while a cold water outlet or coupling element 56 is provided at the upper end of the section 18 communicating with the outlet chamber 53 and adapted for connection by the pipe 12 to the hand valve 15.

It will now be appreciated that the hot and cold water inlet chambers 32 and 52 are disposed in side-by-side relation, while the hot and cold water outlet chambers 33 and 53 are also disposed in side-by-side relation and interposed between the inlet chambers. Further, the valve openings 31 and 51 each communicate between a respective adjacent pair of inlet and outlet chambers.

The adjacent, facing surfaces of inner side walls 19 and 39 are each of generally conical or cupped configuration, as at 58 and 59. The cupped walls 58 and 59 may be of substantially identical contour, but of opposite hand, and in facing relation with each other to define therebetween an additional or intermediate chamber 60. The chamber 60 is thus interposed intermediate the adjacent outlet chambers 33 and 53. Centrally of each cupped or conical internal chamber wall 58 and 59, the walls are respectively formed with recesses 61 and 62. The recesses 61 and 62 are in aligned facing relation with each other and may be generally coaxial with the aligned valve openings 31 and 51. Further, centrally of each recess 61 and 62, the walls 19 and 39 may be formed with through holes or ports 63 and 64, respectively. The ports 63 and 64 may be coaxial with the valve openings 31 and 51, so that the ports and valve openings are all in alignment with each other.

Interposed between the facing intermediate chamber surfaces 58 and 59, and extending entirely across the intermediate chamber is a resiliently flexible diaphragm 65, say of phosphor bronze, or other suitable diaphragm material. The diaphragm is sandwiched between the inner section side walls 19 and 39, which walls are secured together by any suitable sealing means (not shown). One or more 0 rings 66, or other suitable sealing means may be employed to effectively seal the chamber 60 with the diaphragm 65 in sandwiched relation 65, between the side walls 19 and 39. Centrally of the diaphragm 65, between the recess 61 and 62, there may be fied to the diaphragm a hub or boss 67 protruding from the diaphragm to the diaphragm on opposite sides thereof, and which may have a central internally threaded through hole 68.

A pair of rods or valve stems 69 and 70 project from the central region of the diaphragm 65, generally normal thereto and in opposite directions, for entry into respective valve openings 31 and 51. In particular, one of the valve stems, say stem 70, may have a reduced, externally threaded hub opening 68, while the other valve stem 69 may have an internally threaded shank 71 extending in threaded relation through the threaded hub opening 68, while the other valve stem 69 may have an internally threaded end hole 72 in threaded receiving relation with the shank 71. This means of securing valve stems 69 and 70 to diaphragm 65 for movement therewith affords the stems a degree of longitudinal adjustability. This may be desirable in an initial setting of the device, but such adjustability may be obtained by any desired construction.

Carried on the outer ends of valve stems 69 and 70 are respective valve elements or heads 74 and 75, respectively located in the hot water inlet chamber 32 and cold water inlet chamber 52. The valve members 74 and 75 are movable upon deflection of diaphragm or membrane 65 and longitudinal shifting of aligned valve stems 69 and 70 into closed, seated engagement with the respective adjacent valve seats 30 and 50. That is, upon rightward deflection of diaphragm 65, as seen in FIG. 2, valve member 74 moves toward its closing relation with valve openings 31, while valve member 75 moves toward its full open relation with valve opening 51. Of course, operation is reversed upon leftward deflection of the diaphragm. The above-described longitudinal adjustment of valve stems 69 and 70 is facilitated by the provision of screw slots, or the like, as at 76 and 77 on valve members 74 and 75, respectively, facing toward their adjacent respective access openings 22 and 42.

It will be observed in FIG. 2 that the valve stems 69 and 70 pass in spaced relation through the respective ports 63 and 64 so as to leave annular port openings of substantially reduced area. This spaced relationship of stems 69 and 70 in ports 63 and 64 insures the absence of friction, and affords damping of fluid surges and vibrations, as will appear presently.

In operation, it is only necessary to make the desired initial setting of the hand valves 14 and 15, and the control device 10 thereafter automatically maintains the ratio or proportion of flow of the initial setting. To illustrate the principle of peration, let us assume that hot and cold water flows are initially set at equal flow rates. The pressures in outlet chambers 33 and 53 are therefore equal. If we assume that water pressures in inlet chambers 32 and 52 are equal, the dynamic forces on valve member 74 and 75 are equal and pressures on opposite sides of diaphragm 65 in chamber 60 are equal. The diaphragm is therefore located in its central position, and the valve members 74 and 75 are located symmetrically so as to provide openings of equal area through valve openings 31 and 51. Assuming an increase in cold water supply pressure, this would apply an increased dynamic force to valve member 75 urging the latter leftward, and tend to raise water pressure in outleg chamber 53, which is communicated through port 64 to the right-hand side of chamber 60 for urging the diaphragm 65 leftward against its inherent resilience. The valve member 75 thus tends to open valve opening 31 so that cold water flow is reduced and hot water flow is increased. The diaphragm size and strength, as well as the sizes of valve openings 31 and 51, and valve members 74 and 75 are selected so that the tendency for increased hot water flow and decreased cold water flow actually maintain the originally selected flow rates, equal flow rates in this illustration.

Of course, in the event of a pressure drop in either the hot or cold water supply, the action is opposite to that described above. Moreover, if there is a pressure drop to zero of one supply line, say the cold water supply, the hot water valve member 74 is shifted to its limiting rightward position in closing engagement with the valve seat 30.

In the event of vibration or surge in one water supply line, say water hammer, or the like, the effect of such transient pressures is substantially eliminated by damping before transmission to the diaphragm 65. This is accomplished by the damping action of the constricted ports 63 and 64. Further, should extremely high pressures be transmitted to the diaphragm 65, on one side or the other, the internal wall surfaces 58 and 59 of intermediate chamber 60 are configured for supporting facing engagement with the diaphragm before the latter is distended beyond its elastic limit. In normal operation, a valve member 74 or 75 will seat or engage its respective seat prior to engagement of the diaphragm 65 with an internal surface 58 or 59.

Thus, while the resilience of the diaphragm 65 is advantageously employed in operation of the instant device, as in affording resistance to unbalanced pressures on opposite sides of the diaphragm, permanent deformation of the diaphragm is positively prevented.

Referring to FIG. 3, there is shown a pressure equalizing device 79 comprising a hot water inlet chamber 81 connected to a hot water outlet chamber 83 by a valve port 85. A cold water inlet chamber 87 is connected to cold water outlet chamber 89 by a valve port 91.

An intermediate chamber 93 is divided into a hot portion 95 and a cold portion 97 by a diaphragm 99 which is clamped at its edges by walls 101 and 102 of chamber 93.

An air vent 105 is formed in wall 101 and extends from hot portion 95 of intermediate chamber 93 to hot water outlet chamber 83. Similarly, an air vent 107 is formed in wall 101 and extends from cold portion 97 of intermediate chamber 93 to cold water outleg chamber 89. Vents 105, 107 serve the purpose of venting air from the interior of intermediate chamber 93. Without the vents, air in intermediate chamber 93 would interfere with proper damping, and water hammer and diaphragm oscillation would result.

The inner surface of walls 101 and 102 are so formed and positioned that they act as stop members for diaphragm 99 and are contacted by the diaphragm before the material of the diaphragm has passed its elastic limit.

A pair of valve stems 109 and 111 are mounted on the central portion of diaphragm 91 and extend laterally therefrom through ports 113 and 115 formed in walls 101 and 102, respectively. Valve stem 109 supports a valve head 117 adapted to seat in valve port 85, and valve stem 111 supports a valve head 119 adapted to seat in port 91.

A pair of back-up plates 121 and 123 are mounted on opposite sides of diaphragm 99 by adhesive layers 125, 127. The tight gripping of the diaphragm 99 by the adhesive layers prevents stretching of the diaphragm portion between the plates 121 and 123 so that pressure equalizing device 79 works well.

Valve head 117 forms an orifice 129 with valve port 85, and valve head 119 forms an orifice 131 with valve port 91.

FIG. 4 shows a view in section of a pressure equalizing device 133 comprising a hot water inlet chamber 135 connected to a hot water outlet chamber 137 by a valve port 139, and a cold water inlet chamber 141 connected to cold water outlet chamber 143 by a valve port 145.

An intermediate chamber 147 is divided into a hot portion 149 and a cold portion 151 by a diaphragm 153 clamped at its edges by walls 155 and 157 of intermediate chamber 147.

An air vent 159 is formed in wall 155 and extends from hot portion 149 of intermediate chamber 147 to hot water outlet chamber 137. Similarly, an air vent 161 is formed in wall 157 and extends from cold portion 151 of intermediate chamber 147 and to cold water outlet chamber 143. Without the vents, air in intermediate chamber 147 would interfere with proper damping of the diaphragm 153, and water hammer and diaphragm oscillation would result.

The inner surface of walls 155 and 157 are so formed and positioned that they act as stop member for a diaphragm 153 and are contacted by the diaphragm before the diaphragm material has passed its elastic limit.

A pair of valve stems 163, 165 are mounted on the central portion or annular boss 167 of diaphragm 153 and extend laterally therefrom through ports 169 and 171 formed in walls 155, 157, respectively. Valve stem 163 has formed integral therewith a valve head 173 which forms an orifice 175 with valve port 139, and valve stem 165 has formed integrally therewith a valve head 177 which forms an orifice 179 with valve port 145. Valve head 173 is adapted to seat in valve port 139, and valve head 177 is adapted to seat in valve port 145.

Pressure equaling device 133 may be formed as two identical castings 181 and 183 that are joined together by suitable fasteners passing through aligned holes 187. Hot water inlet chamber 135 has interior threads 189 that receive a threaded washer 191 forming the valve port 139 and cold water inlet chamber 141 has interior threads 193 that receive threaded washer 195 forming valve port 145. Threads 189 are adapted to receive the external threads of a hot water inlet pipe, and threads 197 are adapted to receive the exterior threads of a cold water inlet pipe. Threads 197 are adapted to receive the external threads of a hot water outlet pipe, and threads 199 are adapted to receive the external threads of a cold water outlet pipe.

Wall 155 has formed therein an annular groove 201 and wall 157 has a matching annular groove 203. The grooves 201 and 203 receive an annular boss 205 that forms the edge of diaphragm 153 and securely hold the diaphragm in place.

An internally threaded hollow bushing 207 is positioned in the central hole of diaphragm and has a head 209 that bears against a back-up plate 211 and a nut 213 that bears against a back-up plate 215.

The lower end 217 of valve stem 163 is reduced in cross section and is threaded into the interior of bushing 207 and has a land or shoulder 219 that is adapted to abut bushing head 209. Similarly, the lower end 221 of valve stem 165 is of reduced cross section and is threaded into the interior of bushing 207 and is provided with a land or shoulder 223 adapted to abut the bottom end of bushing 207.

FIGS. 5 and 6 show a poppet 225 having a stem 227 with a threaded reduced portion 229 and land or shoulder 231, and a head 233 and screw driver slot 235 for easier adjustment of poppet 225. A self-locking insert 237, preferably made of nylon, is mounted in a longitudinal groove in stem portion 229. Threaded poppets 225, it is to be noted, are provided with integral lands 231 to assure uniformity of assembly of the pressure, regulating devices. The self-locking inserts 237 are distorted during assembly and prevent unwanted movement of poppets 225 out of their adjusted positions.

FIG. 7 shows a diaphragm 239 having a central opening 241 adapted to receive a bushing, enlarged central ring 243 and an edge boss or ring 245 adapted to seat in the grooves of a pressure-equalizing device and be clamped thereby.

A washer 247 having a flange 249, and a washer 251 having a flange 253 are adapted to be clamped to central ring 243.

In operation, initially either the cold water or the hot water is turned on. If the cold water is turned on, the cold water enters the cold portion of the intermediate chamber and pushes the air out through the vent. With no pressure in the hot water portion of the intermediate chamber, the diaphragm moves toward the hot water portion and the cold water valve head closes the clod water valve to shut off the entrance of cold water. If then the hot water is turned on to equalize the pressures, the hot water enters the hot portion of the intermediate chamber and pushes the diaphragm back to the middle and pushes out any air through the vent. Then if the hot water pressure varies, the diaphragm will vary the pressure of the cold water, and if the cold water pressure varies, the diaphragm will vary the pressure of the hot water.

The diaphragm is made of a very compliant material so that it deflects easily. Materials presently preferred are ethylene propylene rubber, and neoprene. Its position is essentially a function of the pressure forces only, with the elastic forces in the diaphragm being approximately zero. The diaphragm back-up plates or washers reinforce the center portion of the diaphragm and restrict diaphragm deflection to the ring between the plates and the walls of the intermediate chamber. The poppet heads throttle the flow of fluid at the orifices which they form with the valve ports.

The inner surfaces of the walls of the intermediate chamber limits the movements of the diaphragm and the maximum strain on the material to prevent stretching beyond the elastic limit of the material or rupture of the material. This is important, especially at the initial installation of the device, because the hot and cold lines cannot normally be turned on simultaneously. Accordingly, when one line is turned on, the diaphragm is immediately stretched to its maximum. The size of the orifices between the poppet stems 109, 111 and the valve ports 85, 91 are such that the flow of fluid is restricted so as to provide the damping necessary to system stability and avoid water-hammer.

The diaphragms are preferably molded, thus assuring proper seating of poppets in their valve ports and preventing irreversible distortion of the diaphragm with respect to its back-up plates and intermediate chamber walls. It should be noted that metal to metal seating of the castings is obtained, thus assuring identical squeeze of the outer sealing ring of the diaphragm.

The threaded poppet members of FIGS. 5 and 6 with their integral land assure uniformity of assembly, and the self-locking inserts assure that the poppets remain in position and do not back-up.

The flanges 249 and 253 are back-up washers 247 and 251 capture the diaphragm ring 243 and prevent it from pulling out.

The annular grooves 201 and 203 in the castings serve to locate the diaphragm and seal the intermediate chamber by squeezing the annular boss or ring 205 of the diaphragm.

My pressure equalizing device is very accurate, and its accuracy depends upon the ratio of the area of the diaphragm to the flow area. The following explanation will illustrate this accuracy.

Nomenclature $p_h$ = hot water supply pressure, psig
$P_c$ = cold water supply pressure, psig
$P_{h_c}$ = hot water controlled discharge pressure, psig
$Pc_c$ = cold water controlled discharge pressure, psig
$T_h$ = hot water temp. °F
$T_c$ = cold water temp. °F
$A_o$ = valve orifice area, in.²
$A_h$ = hot water flow area, in.²
$A_c$ = cold water flow area, in.²
$A_d$ = diaphragm area, in.²
$D_h$ = drag upon poppet from hot water, lbs.
$D_c$ = drag upon poppet from cold water, lbs.
$M_h$ = hot water mass flow, slugs/sec
$M_c$ = cold water mass flow, slugs/sec
$v_h$ = hot water velocity through orifice, ft/sec
$v_c$ = cold water velocity through orifice, ft/sec Considering that the diaphragm 99 readily deflects, being very compliant over the range of axial deflections required by the diaphragm (approx. 0.048 inches), a very slight force is required to bottom valve heads 117, 119 in either direction on valve ports 85, 91. Tests show that this force is less than one-fourth pound. Accordingly, since this force's magnitude is very low compared with the pressure forces acting upon the diaphragm 99, it is neglected in the analysis which follows with no significant loss in accuracy.

With the above approximation, the diaphragm 99 can be considered to assume a position which results in the fluid pressure forces upon it being balanced. This is most easily determined by first considering the drag of the fluid past the valve heads 117, 119, in conjunction with the mass flow and velocity through the orifices 129, 131 formed between valve heads 117, 119 and their respective ports 85, 91. Accordingly, $A_o(P_h - P_{h_o}) - D_h = M_h v_h$
and $D_h = A_o(P_h - P_{h_o}) - M_h v_h$
Similarly, $D_c = A_o(Pc - Pc_c) - M_c v_c$ In addition to the drag forces, the other forces to be considered are the controlled pressures which act upon the diaphragm 99, and the momentum reversal effects upon the diaphragm. These latter forces are, of course, $M_h v_h$ and $M_c v_c$, since the axial momentum acquired at each orifice 129, 131 is reduced to zero at the diaphragm backup plates 121, 123, with the pressure rise which this causes being transmitted to the diaphragm 99.

Hence the forces tending to move the diaphragm to the right are balanced by those acting towards the left, yielding $$A_o(P_h - P_{h_c}) + P_{h_c} A_d = A_o(P_c - P_{c_c}) + P_{c_c} A_d.$$

Then $(A_d - A_o)(P_{h_c} - P_{c_c}) = A_o(P_c - P_h)$.

This valve has an orifice 129, 131 diameter of 0.290 inches, or an area approximately 0.06 in$^2$, while with a 2.00 inch (working) diameter diaphragm, its area is approximately 3.14 inches$^2$, disregarding the diameter of stems 109, 111 since they make no substantial difference in the calculations. Accordingly $$\frac{A_0}{A_d - A_0} = \frac{P_{h_c} - P_{c_c}}{P_c - P_h} \approx .02$$

thus, the error in the controlled pressures is only 0.02 times the error in the supply pressures.

The effect of this error upon the water mixture temperature can be gleamed from the following example: Consider water inlet temperatures of 180°F and 40°F for the hot and cold supplies, respectively, in conjunction with equal inlet pressures and valve settings which yield equal flow volumes. Then, the mixture temperature is $(180 + 40)/2 = 110°F$. Assuming that the pressure changes from 50 psi to 25 psi in the cold line (while the hot remains constant), the error in the controlled outputs is 0.02×25 = 0.5 psi. With the valve sizing of 0.280 inches and about 0.045 inches travel in the diaphragm in each direction, this results in control pressure of about 24 psi for the cold, and 24.5 psi for the hot. Since shower heads are designed to afford no more than 3 psi drop across them (higher pressure drops would become painful), the drops across the metering valves would be 21.0 and 21.5 psi, for the cold and hot, respectively. Since the flows through each are proportional to the square root of the pressure drop, the ratio of hot to cold flow becomes 4.29 and 4.33, respectively. This results in a mixture temperature of $$\frac{4.29 \times 180 + 4.33 \cdot 40}{4.29 + 4.33} = \frac{770 + 173}{8.62} = \frac{943}{8.62} = 109.5° F.$$

Hence, a 50 percent drop in pressure results in only ½° temperature change. It is interesting to consider the temperature which would have resulted without a pressure balance valve. Similar calculations yield a final corresponding temperature of 123°F.

From the foregoing, it is seen that the present invention provides a shower temperature control which fully accomplishes its intended objects and is well adapted to meet practical conditions of manufacture, installation and use.

ADDITIONAL EMBODIMENT OF THE INVENTION

An additional embodiment of the invention is shown in FIGS. 8, 9 and 10 wherein pressure balance device 300 is shown as including a pair of substantially identical sections 317 and 318, which sections are of identical construction (but where one is oriented 180° with respect to the other one) to accommodate respectively hot and cold water of any other two types of fluids. The hot water section 317 as best seen in FIG. 9 includes hot water inlet opening 335 and hot water outlet opening 336.

Both of these openings are externally threaded for attachment to other fittings.

The cold water section 318 is similar and includes cold water opening 355 and cold water outlet 356 which are also externally threaded. As seen in FIG. 9, the inlet and outlet openings are each bridged by wall 360 that merges with shoulders 361 that are a part of cylindrical walls 362.

On the cold water side similar shoulders 361 exist as well as a similar bridging wall 362.

It will also be noted from FIG. 8 that each of the sections 317 and 318 include a circular boss 364 that extends outwardly from base 365 in the case of hot water section 317 and from the base 366 in the case of cold water section 318.

Referring again to FIG. 9 it will be seen that the hot water inlet 335 leads to hot water passageway 368 which communicates with hot water outlet 336. To the same effect is the cold water passageway 370 which communicates with both cold water inlet 355 and outlet 356.

As further seen in FIG. 9 a pair of rods or valve stems 372 and 374 having valve heads 376 and 378 extend respectively into the hot water and cold water inlet openings. It will be appreciated that the downward continuations of the walls 360 and 362 possess openings 380 and 382 that permit the loose passage of the valve stems such that there is an opening (either 380 or 382) that communicates with each inlet line and the passageway 368 or 370. Such an opening allows the flow of liquid from the inlet line into one of the respective passageways 368 or 370 when the valve elements or heads 376 and 378 are not seated in a closing position, but are rather in an open position as shown in FIG. 9, all of which will be covered in greater detail hereinafter.

Attention is now called to intermediate chamber 384 that houses diaphragm 386. It will be seen from FIG. 9 that the valve stems 372 and 374 are secured to the diaphragm 385, such that the deflection of one of the valve stems is conveyed instantaneously to the diaphragm 386, and this in turn actuates the other valve stem in a manner similar to that previously discussed in connection with the devices of FIGS. 1 to 7 inclusive.

However, the device of FIGS. 8 to 10 can be manufactured at an economical cost and is so reliabe in operation as to qualify for commercialization for the reasons to be set forth hereinafter.

The device of FIGS. 8 to 10 possesses superior characteristics for the following reasons:

1. It is a two-piece housing that can be readily molded, and it includes means to locate the housings with respect to each other.

2. It possesses means for locating the diaphragm that effectively squeeze the sealing lip of the diaphragm without causing an over-center condition.

3. A floating washer for sealing the valve elements is provided to overcome any normal manufacturing irregularities.

Attention is now called to certain details of construction that will be covered in conjunction with the advantages of this embodiment of the invention.

As shown in FIG. 10 the intermediate chamber 384 is formed by parallel circular plates 388 and 390 which as shown in FIG. 9 rest on a circular lip 392 formed within both bases 365 and 366. Each of the circular plates 388 and 390 possess central openings 394 to permit the passage of valve stems 372 and 374 as seen in FIG. 9.

The circular plates 388 and 390 are preferably cast from metal, although plastics and other common materials may be used in the manufacture of the circular plates. As further seen in FIG. 10, the circular plates 388 and 390 also include straps 396 extending from the central portions of the plate outwardly to terminate in a shoulder 398 that possesses a lip 400 having a venting opening 402 formed therein. The strap 396 may be integrally cast with the plates 388 and 390.

As seen in FIG. 9 the plates 388 and 390 are essentially parallel with respect to each other in order to define the intermediate chamber 384. Furthermore, the shoulders 398 of the plates 388 and 390 approach each other such that the two lips 400 are upstanding very close to each other. It will also be seen from FIG. 9 that the lips 400 each possess an inner levelled surface 404 to define a truncated area that receives a portion of the web 406 of diaphragm 386.

The diaphragm 386 includes a main deflecting portion 408 having a central opening into which is seated a threaded stud 410 having internal threads 412.

Formed outwardly of the main diaphragm portion 408 is the web 406 that terminates in sealing lip 414.

It will be seen from FIG. 9 that the threaded stud 410 possesses cylindrical projections 416 that enable the stud to be tightly held within the main diaphragm portion 408. It is to be noted that the diaphragm 386 is made of a suitable elastomeric or flexible rubber, plastic or other material in order to transmit the unbalancing forces of one line to the other line.

The internal threads 412 of the stud 410 tightly receive a portion of the threaded end 418 of each of the valve stems 372 and 374. Here the floating washers 420 have an important function. Normal manufacturing irregularities create the probability that a tight seal will not be obtained when the valve elements or heads 376 and 378 are seated in closed position upon boss 422 that is formed near the outer end of the openings 380 and 382.

Thus the floating washers 420 (which may be of a somewhat flexible, wear resistant material like glass filled Teflon plastic) are provided and are positioned against the boss 422 so that the bevelled edge 424 of the valve heads 376 and 378 will contact the floating washers 420 in closed position rather than the boss 422.

It can be seen from FIG. 9 that the effective length of the valve stems 372 and 374 can be adjusted by simple rotation of threaded ends 418 in the stud 410, and so in this way it is a relatively easy matter to achieve an effective length of the valve stems 372 and 374 that will provide a good and tight closing action of the valve elements or heads 376 and 378 against the floating washers 420 that are somewhat compressible. Hence, normal manufacturing irregularities are easily compensated for.

Another feature of the invention resides in providing means for locating the diaphragm that will effectively squeeze the sealing lip 414 of the diaphragm without causing a bellying of the diaphragm. Such means are an internal part of the bases 365 and 366.

With reference to FIG. 9 it will be seen that each of the bases 365 and 366 possesses an internal circular projection 426 as well as an inner shoulder 428 and an outer shoulder 430 that abut together in a tight joint 432.

It will be seen that the lip 414 of the diaphragm is received in the space 429 defined by shoulders 428 and 430 of each of the mating bases 365 and 366, such that the respective projections 426 are diametrically opposed to each other. It is to be noted that the space 429 which receives the lip 414 is so sized as to achieve the existence of an outward clearance area 436.

From the foregoing, it will be seen that the lateral inward pressure applied to the lip 414 by the diametrically opposed projections 426 as well as the general inward pressure applied upon the diaphragm lip 414 by the tight securement of the two bases 365 and 366 together, causes a squeezing of the elastomeric material from which the lip 414 is made. The inner shoulders 428 prohibit inward migration of the lip 414 and the existence of the clearance 436 provides a ready area to receive the flow of the lip 414. Hence the lip 414 flows outwardly and not inwardly.

By virtue of the foregoing the diaphragm is not caused to belly inwardly upon the web portion 406 and hence the diaphragm is held in a tight position so that it will be equally influenced by pressure coming from either side of the diaphragm. It will also be seen that the diaphragm lip 414 pilots on the inner diameter or inner shoulders 428 that are formed in the bases 365 and 366.

From the foregoing, it will be seen that this embodiment of the invention is provided in the form of a two piece housing that can be readily molded with means (openings 438 and lugs 440) to locate the identical housings with respect to each other. The housings can be molded from plastics like polypropylene or other materials like rubber or even cast from metal.

Furthermore, the housings include bases possessing projections that penetrate the lateral wall of the lip of the diaphragm to cause a squeezing action on the outer lip. Since the outer lip pilots on the inner diameter of a rim, the rubber material of the lip is forced to flow outwardly in a space provided for that purpose. Thus, the main portion of the diaphragm is held in a tight condition and is not bellied.

Finally, floating washers 420 are provided to be contacted by the bevelled edge of the valve heads that extend from the valve stems. Thus, the valve heads seat tightly against the floating washers irrespective of minor manufacturing variations.

Attention is now called to FIG. 10 wherein it will be seen that each of the bases 365 and 366 are identical, and for this reason each base possesses openings 438 and lugs 440. It will be appreciated that one of the bases will have to be turned 180° with respect to the other one so that the lugs 440 of one of the bases will interfit in the openings 438 of the other base. The two bases are tightly held together by suitable fastening means such as rivets or other devices as will occur to those skilled in the art.

Without further elaboration, the foregoing will so fully illustrate my invention, that others may, by applying current or future knowledge, adapt the same for use under various conditions of service.

What is claimed as the present invention is:

1. A pressure balance valve comprising hot and cold inlet and outlet chambers having inner openings, an intermediate chamber interposed between said chambers, said intermediate chamber containing a flexible diaphragm means, valve stems extending through the intermediate chamber and into said hot and cold inlet chambers, said valve stems terminating in outwardly bevelled valve heads, venting means adjacent said valve stems to relieve the pressure on said diaphragm connection and to provide a damping effect, said bevelled valve heads being movable together under fluid pressure so that one of said valve heads can seat against one of said openings in said hot and cold inlet chambers to close off said chambers in a closing action, a somewhat flexible floating washer positioned about said bevelled valve heads whereby the closing action of said bevelled valve heads is against one of said washers whereby a change in relative pressure in one of said inlet chambers effects a change in the position of said diaphragm means to deflect said diaphragm means toward the other of said inlet chambers to correct said relative pressure change.

2. The pressure balance valve of claim 1 wherein said diaphragm is in a single plane.

3. The pressure balance valve of claim 1 wherein the motion of said diaphragm is in both directions.

4. The pressure balance valve of claim 1 including a housing for said valve, said housing comprised of two identical bases.

* * * * *